(12) United States Patent
Benson (10) Patent No.: US 6,253,757 B1
(45) Date of Patent: Jul. 3, 2001

(54) STONE AND TILE TABLE SAW APPARATUS

(76) Inventor: Walter J. Benson, 8201 NW. 8 Pl., Plantation, FL (US) 33324

( * ) Notice: Subject to any disclaimer, the term of this patent is extended or adjusted under 35 U.S.C. 154(b) by 0 days.

(21) Appl. No.: 09/073,770

(22) Filed: May 6, 1998

(51) Int. Cl.[7] .................................................. B28P 7/04
(52) U.S. Cl. ...................... 125/35; 125/13.01; 125/11.22
(58) Field of Search ................................ 125/35, 13.02, 125/13.03, 13.01, 11.22, 8; 83/478, 477.2

(56) References Cited

U.S. PATENT DOCUMENTS

| | | | |
|---|---|---|---|
| 2,743,717 | * 5/1956 | Wilkin | 125/35 |
| 2,872,758 | * 2/1959 | Hoerst | 125/13.02 |
| 3,008,462 | 11/1961 | Williams | 125/13 |
| 3,170,454 | 2/1965 | Mangis | 125/13 |
| 3,249,134 | * 5/1966 | Vogl et al. | 83/477.2 |
| 3,451,386 | * 6/1969 | Naito et al. | 125/13.02 |
| 3,880,032 | * 4/1975 | Green | 83/478 |
| 4,080,952 | 3/1978 | Wain | 125/13 R |
| 4,107,883 | 8/1978 | Bein | 51/165.8 |
| 4,418,597 | * 12/1983 | Krusemark et al. | 83/478 |
| 4,779,603 | * 10/1988 | Crocetti | 125/13.02 |
| 4,874,025 | * 10/1989 | Cleveland | 83/478 |
| 4,976,251 | * 12/1990 | Smith | 125/13.01 |
| 6,000,387 | * 12/1999 | Lee | 125/13.01 |

* cited by examiner

Primary Examiner—Joseph J. Hail, III
Assistant Examiner—Lee Wilson
(74) Attorney, Agent, or Firm—Frank L. Kubler (57) ABSTRACT

A saw apparatus for cutting a work piece includes a circular saw blade, a saw blade drive mechanism including a motor drivably connected to the saw blade and having a motor pulley, and including a blade mounting structure, a saw table including a housing with a housing side wall, and a housing top wall having a blade passing opening and being hingedly secured to and resting on the housing side wall, a housing partition defining a drive mechanism chamber and a blade mounting chamber within the housing having a drive mechanism chamber bottom wall sealingly joined to the housing side wall, and a cooling liquid contained within the blade mounting chamber, so that the blade mounting mechanism includes a blade axle extending through the housing partition between the blade mounting chamber and the drive mechanism chamber, and the blade protrudes up through the blade passing opening and down into the cooling liquid, and a blade axle pulley is secured to the blade axle, passes through the housing partition, and a belt extends from the blade axle pulley to the motor pulley.

4 Claims, 6 Drawing Sheets

STONE AND TILE TABLE SAW APPARATUS

BACKGROUND OF THE INVENTION

1. Field of the Invention

The present invention relates generally to the field of saws for cutting stone and tile work pieces. More specifically, the present invention relates to a stone and tile saw apparatus including a circular blade, a drive motor, a saw table, a blade cooling system, a saw guard and a laterally spaced guard arm mounting assembly. The saw table has a horizontal top wall with a drive assembly housing mounted underneath including housing side walls. The table top wall is hingedly secured to and rests on the side walls.

The housing is divided by intersecting and unified motor and pulley partitions forming a combined housing partition into a blade mounting chamber and a combined blade motor and pulley chamber. The housing bottom wall extends beneath and seals the lower end of the blade mounting chamber. The motor and pulley chamber is open at the bottom for ventilation and easy access for servicing. The drive assembly includes a blade mounting bearing-loaded mandrel secured to a mandrel shelf, which in turn is secured to the housing partition within the motor and pulley chamber. A blade axle extends through the mandrel and partition and the saw blade is mounted on the blade axle within the blade mounting chamber. The blade protrudes up through a blade slot in the top wall. A pulley is secured to the blade axle within the motor and pulley chamber. A drive belt connects the blade axle pulley to a motor pulley mounted on the drive motor.

A was guard mounting arm assembly is provided including an arm fulcrum bracket mechanism secured to the table, an arm structure having a pivot end rotatably mounted to said fulcrum bracket mechanism and spaced laterally from the table and a guard end secured to the saw guard. The saw guard includes a channel member pivotally mounted to the arm structure so that the channel member is movable to various elevations over the blade while remaining in an upright orientation.

The blade cooling system includes water, or other cooling liquid, contained within the blade mounting chamber to a level that the lower portion of the blade is continually immersed. A water pump is provided in the blade mounting chamber and connected to a rubber or plastic tube extending upwardly along a housing side wall and along the lower surface of the top wall to the blade slot. The tube forks into two branch tubes and each branch tube extends to a nozzle directed toward a face of the saw blade, near the center of the blade. The pump delivers water from the blade mounting chamber to the nozzles, which spray the water onto both sides of the blade to enhance cooling and to clean debris from the blade. The rotation of the blade throws the sprayed water radially across the blade faces and to the periphery of the blade so that the water is efficiently distributed over the entire blade. The cooling system is critically important due to the high friction and resultant heat generated in the blade during stone cutting.

A drainage system is also provided. Water and debris from the blade wash over the upper surface of the top wall and into drain channels recessed into the upper surface. A series of drain holes in the drain channels pass the water from the channels through the table top wall and back into the blade mounting chamber. The upper surfaces of the housing partition extend across the entire interior of the housing and are sloped and curved downwardly to permit water and debris to slide freely to the bottom of the blade mounting chamber. Some of the drain channels are recessed along the top wall edges and also extend across the top wall, to capture the water and debris without need of upwardly extending retaining walls. An advantage of the recessed drain channels is that they do not obstruct movement of work pieces on the top wall upper surface. The saw guard inventively permits viewing of the blade, and which has a replaceable viewing panel.

2. Description of the Prior Art

There have long been stone and tile table saws having circular blades. Many have been inefficient and awkward to use.

Williams, U.S. Pat. No. 3,008,462, issued on Nov. 14, 1961, discloses a processing saw for cutting and processing rock or stone material. Williams includes a circular saw blade mounted on a saw axle extending through a mandrel. A first pulley is attached to the end of the saw axle opposite the blade and a drive belt connects the first pulley to a second pulley on a drive motor. The mandrel and motor are fastened to a mounting base. A table element is mounted over the base, on which work pieces are placed. An upper portion of the blade extends through a slot in the table element. The bottom portion of the blade extends into a vessel containing cooling water, and the rotation of the blade carries some of the water to the work piece on the table element. Drain holes are provided near the center of the table element to return water to the vessel. A problem with Williams is that water retaining walls around the periphery of the table element limit and obstruct work piece size and movement. Another problem with Williams is that the cooling water does not reach the central area of the blade, so that cooling is incomplete and blade warping may result. Moreover, water scattered on the table element must flow back to the center of the element to drain, limiting drainage efficiency. Still further problems with Williams are that debris inside the saw guard cannot be readily viewed to alert the user to the need for cleaning, and the saw guard itself can obstruct work piece movement.

Toru Naito, et al., U.S. Pat. No. 3,451,386, issued on Jun. 24, 1969, teaches an apparatus for cutting, grinding and polishing ornamental stone. Toru Naito, et al., includes a base frame having support legs. A drive mechanism is attached to the base frame and receives a drive tool. A casing is provided which surrounds the tool on the drive mechanism, and the casing has an opening for introducing work pieces. A water tank supplies cooling water to the blade through a delivery tube having a nozzle. A drainage tube at the bottom of the casing returns water to the tank. A problem with Toru Naito, et al. is that the water delivered to the blade only strikes one blade face, so that cooling is incomplete and imbalanced, and the delivery tube also obstructs user access to the blade. Another problem with Toru Naito, et al. is that the casing obstructs work piece movement during cutting and limits the size of the work piece.

Smith, U.S. Pat. No. 4,976,251 issued on Dec. 11, 1990, reveals a tile saw apparatus and method. Smith includes a cooling water tank, and a circular saw blade is mounted on an axle extending through an upper area of a wall of the water tank. The lower portion of the blade passes through the cooling water as the blade rotates. A work platform is slidingly mounted above the water tank on rails, and has a slot through which the blade passes. A channel member hinged at one end encloses the upper end of the blade to form a saw guard. A problem with Smith is that the work platform is too small to receive and maneuver large work pieces.

Another problem is that the Smith saw guard does not support itself in a raised position, so that cutting thick work pieces is awkward. Mangis, U.S. Pat. No. 3,170,454, issued on Feb. 23, 1965, discloses a tile and masonry table saw. Mangis reveals a saw much like that of Smith, having blades which are partly submerged in cooling water within a compartment beneath the table top.

Wain, U.S. Pat. No. 4,080,952, issued on Mar. 28, 1978, discloses a cooling oil reservoir and a circular saw blade rotatably mounted on the reservoir so that the lower portion of the blade is immersed in the oil. A motor drives the saw blade with a belt and pulleys, and a channel member extends around a lateral edge of the blade to form a shroud for directing the cooling oil picked up by the blade into the cut made in a stone work piece. A problem with Wain is that there is no convenient way to position and hold a work piece, which must be engaged above the shroud. Wain also apparently fails to provide means for preventing the cooling oil from splashing on and otherwise accumulating on the drive belt and drive motor.

Crocetti, U.S. Pat. No. 4,779,603, issued on Oct. 25, 1988, teaches a brick saw container. A saw is mounted to an arm above a work table, and the table is enclosed on three sides by a housing. Water piping delivers water to the blade through opposing sides of a channel-shaped saw guard suspended over the top of the blade. A problem with Crocetti is that the enclosure and the saw guard both substantially obstruct movement and positioning of a work piece, such as during cutting of a U-shaped bottom connection. Both also limit the size of the work piece Crocetti can accept.

Bein, U.S. Pat. No. 4,107,883, issued on Aug. 22, 1978, teaches an apparatus for controlling feed mechanisms of grinding and cutting apparatus. Bein is essentially a box containing a vice for gripping a work piece to be cut by a circular saw blade. The sides of the vice and the box limit the size of the work piece Bein can accept, and completely inhibit movement of the piece necessary to making many types of cuts.

It is thus an object of the present invention to provide a stone and tile cutting table saw apparatus having a liquid cooled blade driven by a belt from a motor in a separate compartment, so that the motor is kept dry.

It is another object of the present invention to provide such an apparatus having a blade which reaches the work piece from underneath so that no corner bur remains in a cut when the cut appears from the top to be complete. The end of the cut curves into the scrap piece rather than out at the bottom of the cut.

It is another object of the present invention to provide such an apparatus including a saw guard which can be positioned at various elevations above the blade to accommodate work pieces of various thicknesses, which remains substantially level at these various elevations, which has a replaceable blade viewing section, and which is mounted on a support assembly spaced laterally from the table and is pivotable to maximize work piece movement and accommodated size range.

It is still another object of the present invention to provide such an apparatus which distributes cooling fluid over virtually the entire surface of each blade face, rather than merely along the blade periphery, for complete cooling and longer blade life.

It is still another object of the present invention to provide such an apparatus in which there is no saw mounting arm protruding upwardly from a side of the table to obstruct work piece movement during cutting.

It is finally an object of the present invention to provide such an apparatus which is reliable, easy to service and economical to manufacture.

SUMMARY OF THE INVENTION

The present invention accomplishes the above-stated objectives, as well as others, as may be determined by a fair reading and interpretation of the entire specification.

A saw apparatus is provided for cutting a work piece, including a circular saw blade, a saw blade drive mechanism including a motor drivably connected to the saw blade and having a motor pulley, and including a blade mounting structure, a saw table including a housing with a housing side wall, and a housing top wall having a blade passing opening and being hingedly secured to and resting on the housing side wall, a housing partition defining a drive mechanism chamber and a blade mounting chamber within the housing having a drive mechanism chamber bottom wall sealingly joined to the housing side wall, and a cooling liquid contained within the blade mounting chamber, so that the blade mounting mechanism includes a blade axle extending through the housing partition between the blade mounting chamber and the drive mechanism chamber, and the blade protrudes up through the blade passing opening and down into the cooling liquid, and a blade axle pulley is secured to the blade axle, passes through the housing partition, and a belt extends from the blade axle pulley to the motor pulley.

A saw apparatus is provided for cutting a work piece, including a circular saw blade, a saw blade drive mechanism including a motor having a motor pulley and including a blade mounting structure having a blade axle to which the blade is mounted and to which a blade axle pulley is mounted, and a belt extending from the blade axle pulley to the motor pulley drivably connecting the motor to the saw blade, a saw table including a housing with a housing side wall, a housing top wall having a blade passing opening, and a blade mounting chamber having a chamber side wall and a sealingly interconnected chamber bottom wall and containing a cooling liquid and a portion of the saw blade, so that the blade protrudes through the blade passing opening and into the cooling liquid, and a cooling liquid pump positioned within the blade mounting chamber, and tubing extending from the pump to the blade passing opening, for delivering the cooling liquid to a face of the blade.

The tubing forks into two branch tubes and each branch tube extends to a nozzle directed toward a central region of a face of the saw blade, so that cooling liquid is sprayed on both of the faces of the blade at the central region and so that rotation of the blade throws the cooling liquid radially across the blade faces and to the periphery of the blade for broad distribution of the cooling liquid over the blade.

A saw apparatus is further provided for cutting a work piece, including a circular saw blade, a saw blade drive mechanism including a motor having a motor pulley and including a blade mounting structure having a blade axle to which the blade is mounted and to which a blade axle pulley is mounted, and a belt extending from the blade axle pulley to the motor pulley drivably connecting the motor to the saw blade, a saw table including a housing with a housing side wall, a housing top wall having a blade passing opening, and a blade mounting chamber having a chamber side wall and a sealingly interconnected chamber bottom wall and containing a cooling liquid and a portion of the saw blade, so that the blade protrudes through the blade passing opening and into the cooling liquid, and a portion of the saw blade, so that the blade protrudes up through the blade passing opening and down into cooling liquid, and a drain channel recessed into the top wall for receiving cooling liquid and debris from the blade washing over the top wall and at least one drain hole in the drain channel for passing the cooling fluid from the drain channel and into the blade mounting chamber.

The apparatus preferably additionally includes a housing partition within the housing dividing and sealingly separating the housing into the blade mounting chamber and a drive mechanism chamber containing the motor and the blade axle pulley and the motor pulley. The drain channel preferably includes a channel peripheral portion extending along the periphery of the top wall. A transverse portion of the channel preferably additionally extends across the top wall upper surface within the channel peripheral portion.

A saw apparatus is further provided for cutting a work piece, including a circular saw blade, saw blade drive mechanism drivably connected to the saw blade, a saw table having a top wall with a blade passing opening through which the blade extends, a saw guard mounting arm assembly including an arm fulcrum bracket structure secured to the table, an arm mounting structure having a pivot end rotatably mounted to the fulcrum bracket structure and spaced laterally from the table and a guard end secured to the saw guard, and a saw guard including a channel member pivotally mounted to the arm mounting structure, so that the channel member is movable to various elevations over the blade while remaining in an upright orientation. The arm mounting structure has at least first arm linkage segment and a second arm linkage segment which are pivotally interconnected, where the first arm linkage segment includes a pivot end. The channel member preferably includes two substantially horizontal and spaced apart side panels and a side panel connecting wall, a section of the connecting wall including a removable transparent section for observing the blade and for monitoring debris collected within the guard. The transparent section preferably includes a slat member and the side panels preferably include guide grooves for slidingly receiving the slat member. The slat member preferably includes a tab portion which protrudes from between the side panels for finger gripping by a user for slat member removal.

BRIEF DESCRIPTION OF THE DRAWINGS

Various other objects, advantages, and features of the invention will become apparent to those skilled in the art from the following discussion taken in conjunction with the following drawings, in which:

FIG. 10a is a top view, and

FIG. 11b is a partial schematic front view of the saw table of FIG. 11.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a stone and tile saw apparatus 10 is disclosed. Apparatus 10 includes a saw table 12, a saw blade 14, a blade drive motor 16, a blade cooling system, a saw guard 140, and a guard mounting arm assembly 100.

Saw Table

Figure 11:
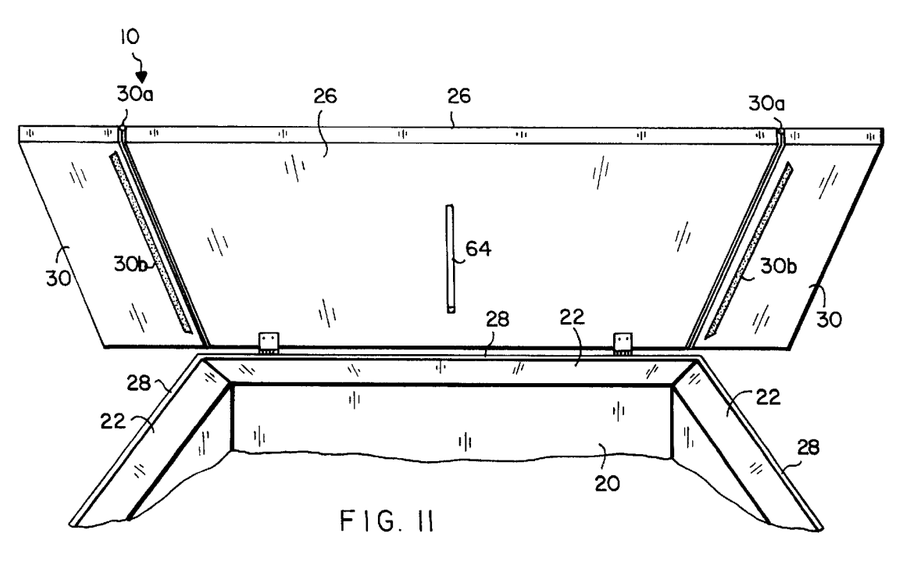
FIG. 11 is a front perspective view of the saw table with the top wall opened and the lateral leaf portion deployed, revealing the drip guard rubber strips.
Figure 11A:
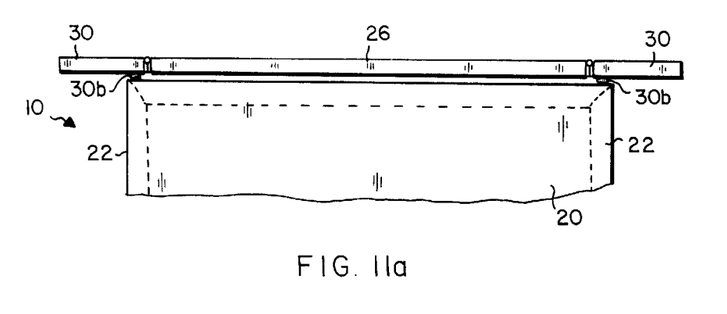

Saw table 12 includes a housing 20 with four housing side walls 22, a housing bottom wall 24 joined in sealing relationship with three side walls 22, and a table top wall 26 secured to a side wall 22 with hinges 32, such that top wall 26 rests on side walls 22. Top wall 26 preferably rests on an elongate water-tight seal 28 provided along the upper surfaces of side walls 22. See FIGS. 1 and 5. Top wall 26 preferably includes lateral leaf portions 30 mounted with hinges 30a which are recessed flush into the top surfaces of top wall 26 and leaf portions 30 adjacent to the lateral edges of top wall 26. Leaf portions 30 fold outwardly, and the hinged ends of leaf portions 30 act as stops to hold extended leaf portions 30 horizontal. Leaf portions 30 meet top wall 26 within side walls 22. A water-tight seal (not shown) is provided between top wall 26 and leaf portions 30. In addition, a rubber strip 30b is preferably provided on each leaf portion 30 to fit just within adjacent side walls 22 to prevent water condensate collecting on the lower surface of top wall 26 from rolling out of housing 20. See FIG. 11. Housing 20 is preferably formed of colored fiberglass resin.

A lid propping latch 18 is provided to hold top wall 26 open during servicing. Housing 20 is divided by a housing partition 34 into a combined motor and pulley chamber 44, and a blade mounting chamber 48. See FIGS. 2–4. Housing bottom wall 24 extends only underneath blade mounting chamber 48 to contain liquid 84. The underside of motor and pulley chamber 44 is preferably open to the air for improved ventilation and for easier access for maintenance. Partition 34 is preferably positioned and shaped to minimize the volume of blade mounting chamber 48, to permit apparatus 10 operation with minimal cooling liquid and thus at minimal apparatus 10 weight. Partition 34 has a motor enclosing section and a pulley enclosing section. Chambers 44 and 48 each have service access doors (not shown).

Blade and Drive Assembly

Circular blade 14 for cutting stone, and alternatively for cutting other materials, is mounted on a blade axle 52 extending through a blade mounting mandrel 54 secured to a mandrel shelf 56. Shelf 56 is secured to the inner surface 62 of a side wall 22 and protrudes into blade mounting chamber 48. Blade 14 protrudes up through a blade slot 64 in top wall 26. A blade axle pulley 72 is secured to blade axle 52 which passes through housing partition 34. A belt 74 extends from blade axle pulley 72 to a motor pulley 76 mounted on a drive shaft 82 of blade drive motor 16. Motor 16 is connected to a power source (not shown) through a first power cord 36 joined with a plug assembly 40 to a second power cord 38, which includes a motor power switch 42. First and second power cords 36 and 38, respectively, are separable at plug assembly 40 so that motor 16 can be removed for servicing or replacement. See FIG. 4.

Saw Guard Arm Assembly

Figure 1:
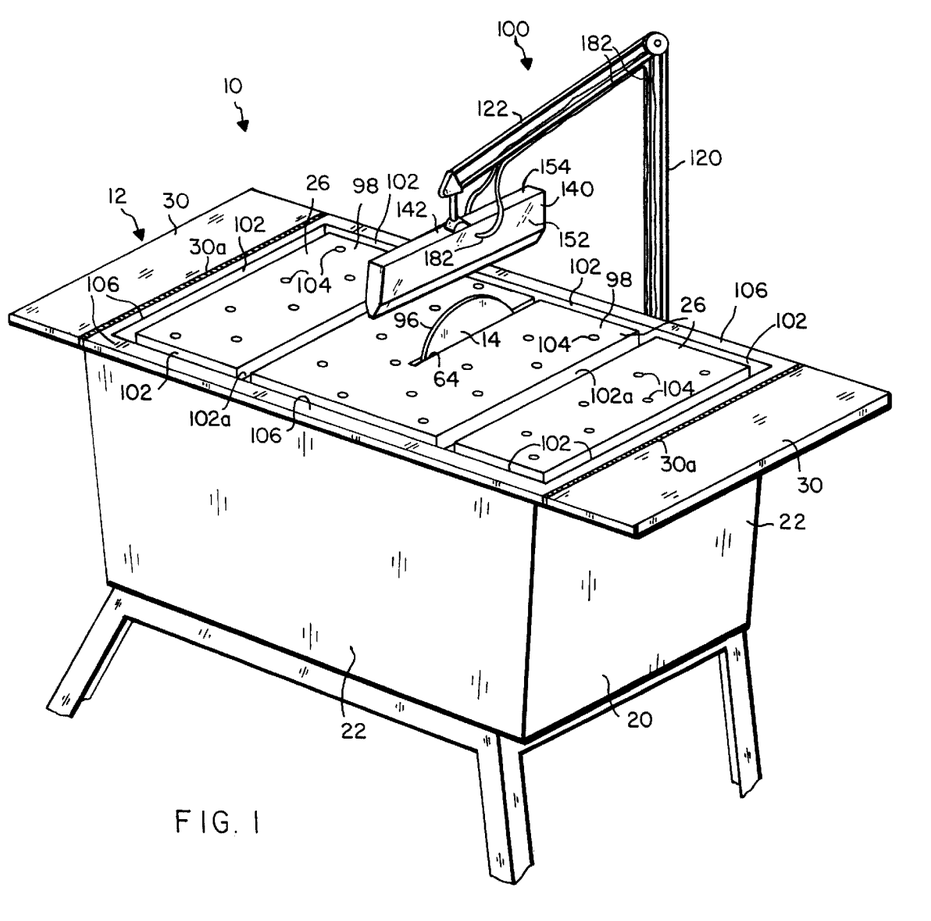
FIG. 1 is a perspective view of the preferred embodiment of the saw apparatus, showing the saw guard arm and guard arm assembly, and the drain channels in the table top wall upper surface.
Figure 2:
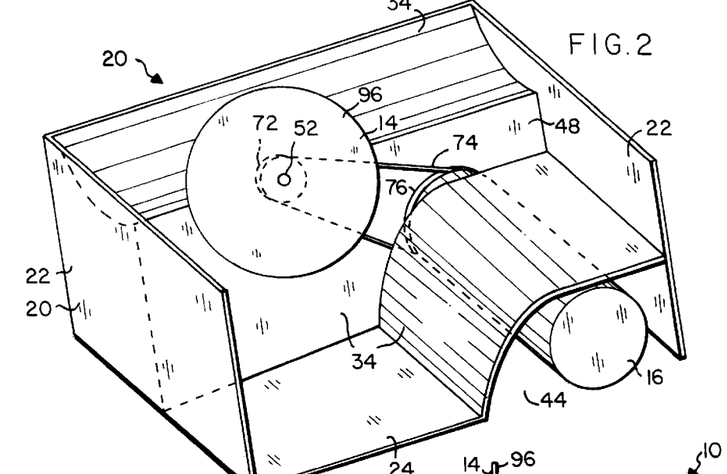
FIG. 2 is a cut-away view of the table and housing, revealing the blade, housing partition, motor, pulleys and mandrel, and their preferred positional relationships with each other.
Figure 3:
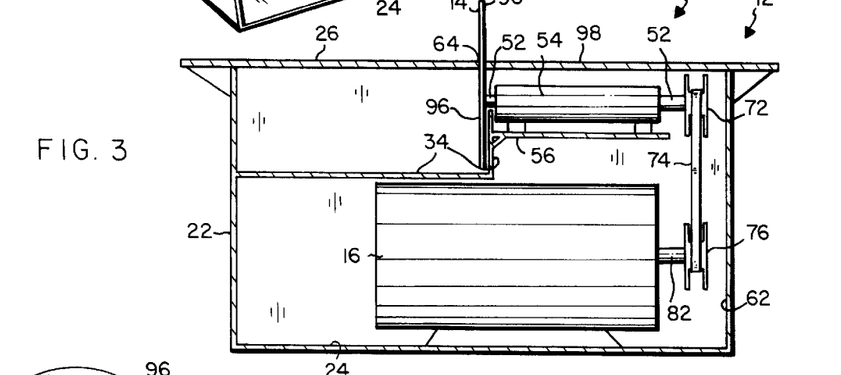
FIG. 3 is a cross-sectional side view of the table and housing, showing the motor, mandrel, mandrel shelf, housing partition and blade.
Figure 4:
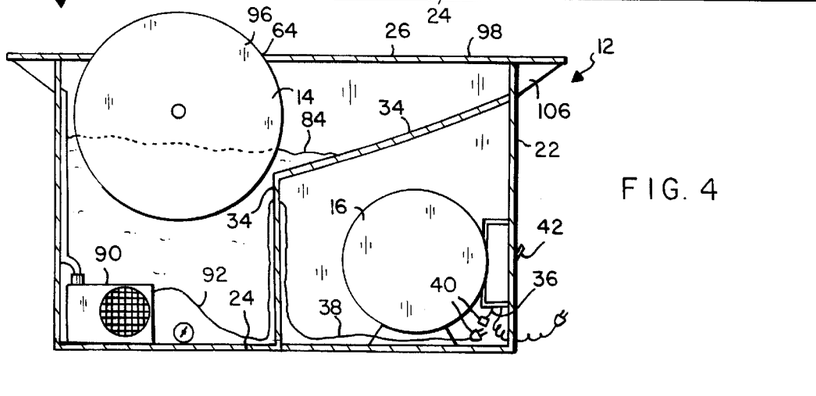
FIG. 4 is a cross-sectional front view as in FIG. 3.
Figures 5, 6:
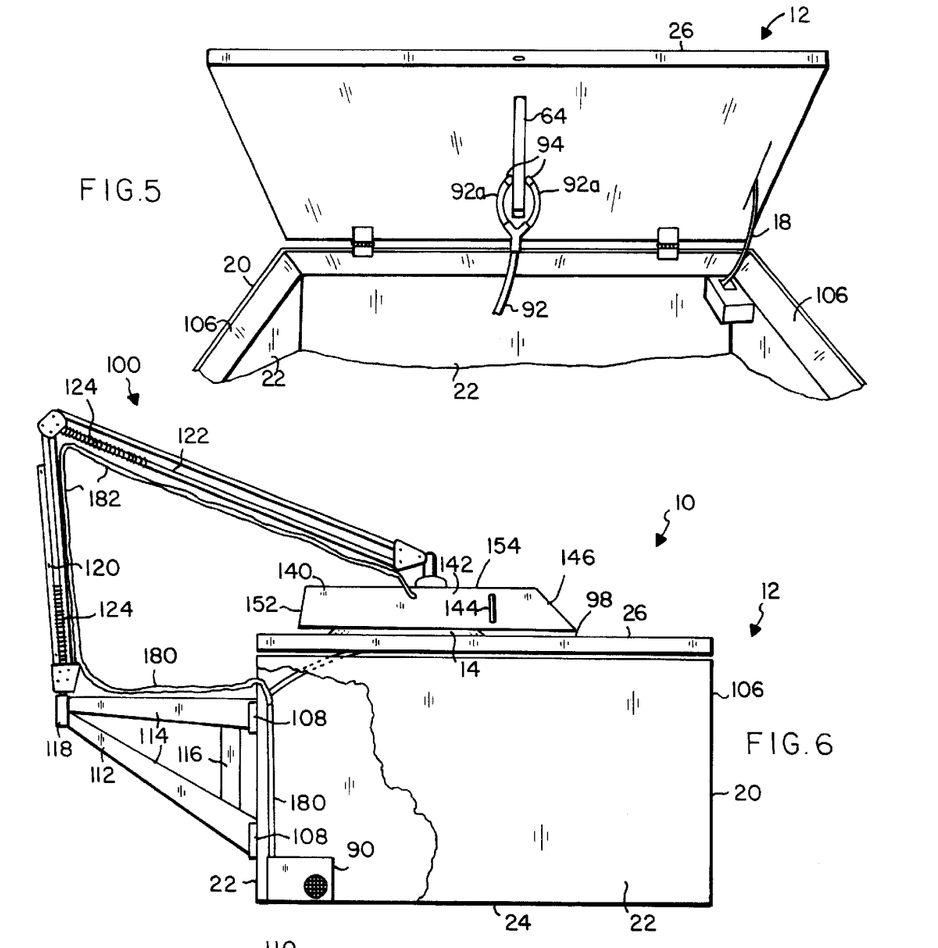
FIG. 5 is perspective view of the housing upper end with the housing top wall open to reveal the branched cooling liquid tubes position to deliver liquid to the opposing blade faces.
FIG. 6 is a front view of the entire apparatus, showing details of the guard arm mounting assembly.
Figure 7:
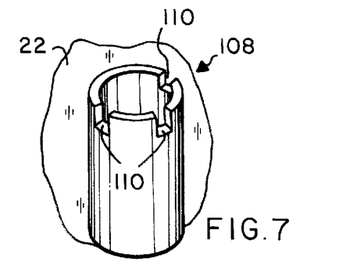
FIG. 7 is a perspective view of one of the fulcrum tubes, showing the three notches.
Figure 8:
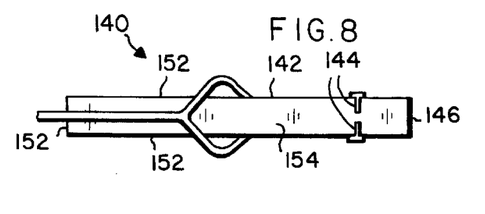
FIG. 8 is a top view of the preferred saw guard and its cooling tube branches, also delivering liquid to both opposing faces of the blade.
Figures 9, 10:
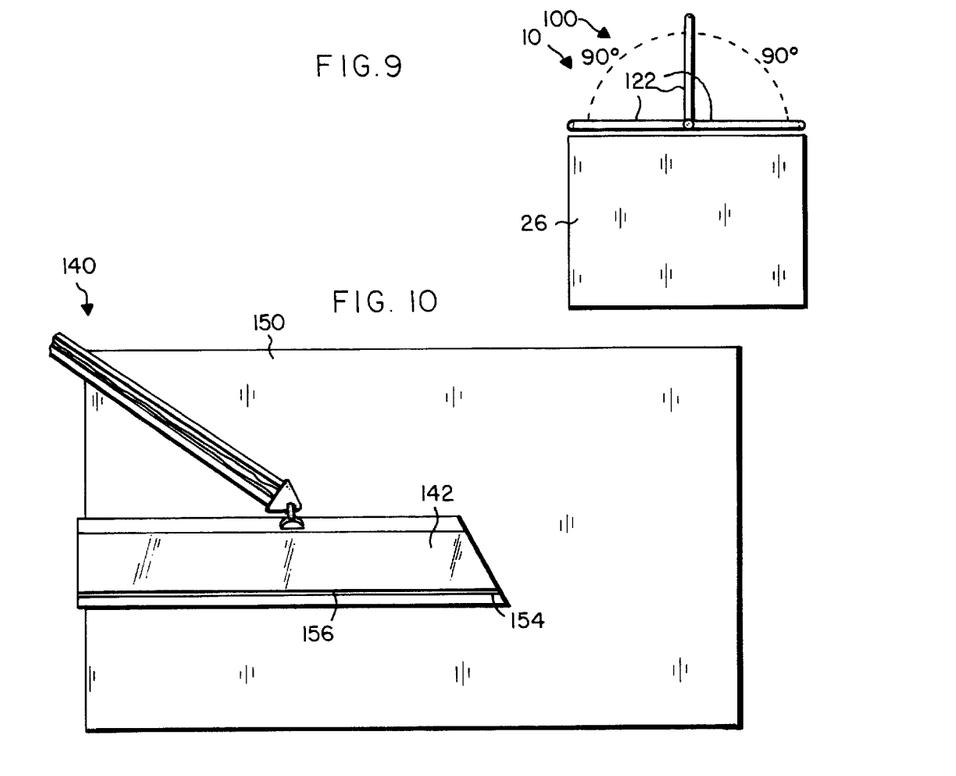
FIG. 9 is a schematic top view of the table top wall and guard arm assembly, showing in broken lines the three positions into which the guard arm can lock.
FIG. 10 is a perspective view of the optional plexiglass shield fitted onto the saw guard assembly.

A guard arm assembly 100 is provided including two vertically spaced apart and axially aligned fulcrum tubes 108 fastened to housing side wall 22. See FIGS. 1, 6 and 7. Fulcrum tubes 108 each have two opposing upper side notches 110 and one outwardly directed upper side notch 110. A C-shaped frame structure 112 is provided having two leg portions 114, each leg portion 114 having a downwardly directed fulcrum pin (not shown). Each fulcrum pin fits downwardly into one of the fulcrum tubes 108, so that frame structure 112 pivots laterally in and radially about the fulcrum tubes 108. A locking tab (not shown) protrudes laterally from each fulcrum pin to fit and removably lock into any one of the notches 110 in the corresponding fulcrum tube 108 to secure structure 112 into any one of three orientations relative to table 12. See FIG. 9. A frame structure vertical strut 116 extends between and is welded to the leg portions 114 to increase frame structure 112 strength. The free end of frame structure 112 has a vertical pivot tube 118 into which is rotatably fitted a cylindrical end of a first arm segment 120. Frame structure 112 laterally spaces first arm segment 120 away from table 12 so that guard arm assembly 100 does not obstruct work piece 130 movement and so that apparatus 10 accommodates greater work piece 130 sizes. A second arm segment 122 is pivotally connected to the free end of first arm segment 120, and the saw guard 140 is pivotally connected to second arm segment 122. The first and second arm segments 120 and 122, respectively, are structurally and functionally analogous and very similar to the linkage arms supporting many desk lamps, preferably having the same type of balance springs 124. This assembly 100 permits movement of saw guard 140 to any of numerous elevations relative to table top wall 26. The fulcrum tubes 108 and upper notches 110 permit rotation of frame structure 112 and assembly 100 to any of three releasibly locking positions relative to table 12 to permit greater flexibility in work piece 130 size and placement.

Saw guard 140 preferably includes a transparent channel segment 142 containing rubber water skimmer flaps 144 which slide against blade faces 96 as blade 14 rotates to limit or prevent over-spray. See FIGS. 6 and 8. The front end of channel member 142 is closed with a channel front wall 146 which is angled outwardly at its lower end and has a debris catching tab 148 protruding from its lower end. The rear end of channel member 142 is closed with an upright channel rear wall 152.

Figure 10A:
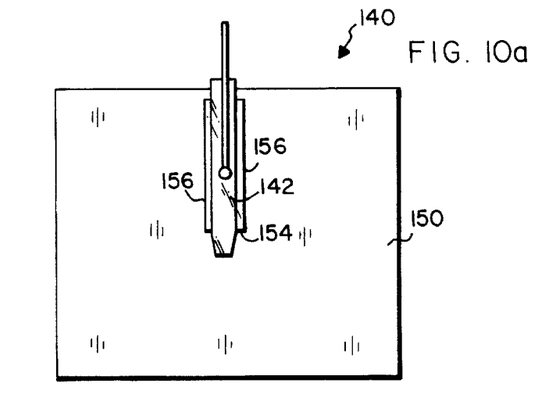
Figure 10B:
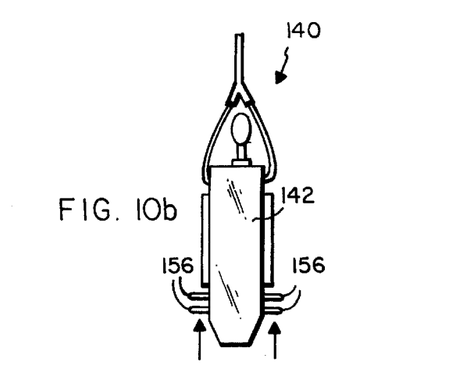
FIG. 10b is a front view, of the shield and saw guard assembly of FIG. 10.

For added shielding, a plexiglass sheet 150 having a channel receiving slot 154 is optionally provided. A pair of longitudinal tracks 156, spaced apart from each other a sufficient distance to snugly receive the thickness of sheet 150, is provided on each side of channel member 142, to removably receive edges of slot 154 in sheet 150. See FIGS. 10–10b.

Cooling System

Blade mounting chamber 48 contains cooling liquid 84 such as water or a light oil to a level such that a lower portion of blade 14 is continually immersed in liquid 84. Cooling is highly important because the high friction inherent in stone cutting produces a great deal of heat in blade 14. A liquid pump 90 is provided in blade mounting chamber 48 and connected to a rubber or plastic flexible tube 92 extending upwardly along a side wall 22 and along the lower surface of top wall 26 to blade slot 64. Tube 92 forks into two branch tubes 92a, and each branch tube extends to a nozzle 94 directed toward each face 96 of saw blade 14, near the center of blade 14. Nozzles 94 are angled slightly upward toward the work piece 130 to direct cooling liquid 84 into the saw cut formed in the work piece 130. Pump 90 delivers liquid 84 from blade mounting chamber 48 to nozzles 94, and liquid 84 is sprayed on both faces 96 of blade 14 to enhance cooling and to clean debris from blade 14. The rotation of blade 14 throws the sprayed liquid 84 generally radially across blade faces 96 and to the periphery of blade 14 so that the cooling and cleaning liquid 84 is efficiently distributed over the entire blade 14.

Cooling liquid tubing 180 branches into branch segment 182 which extends along first and second arm segments 120 and 22 to saw guard 140, where tube branch segment 182 splits into two branch tubes which enter saw guard 140 and deliver cooling liquid 84 against both faces 96 of blade 14.

Drainage System

Water and debris from blade 14 wash over the upper surface 98 of top wall 26 and into to drain channels 102 recessed into upper surface 98 and continue across leaf portion 30. A longitudinal series of drain holes 104 in drain channels 102 and in the top wall 26 upper surface 98 between channels 102 pass liquid 84 from channels 102 back into blade mounting chamber 48. Perimeter channels 102 are recessed along top wall 26 edges and transverse channels 102a extend across top wall 26, capturing liquid 84 without need of any liquid retaining walls extending upwardly from upper surface 98. Perimeter channels 102 are deeper, and preferably twice as deep, as transverse channels 102a so that the mounting edge of a miter guide, mentioned below, can be placed into the transverse channels 102 without the sudden water displacement overflowing perimeter channel 102. Inwardly tilted channel wall portions 106 surround the periphery of top wall 26, and direct drainage liquid 84 into channels 102. Horizontally extending portions of housing partition 34 extend across the entire interior of housing 20 and are tilted or rounded to promote a smooth and unobstructed flow of liquid 84 and debris into the bottom of blade mounting chamber 48. Recessed channels 102 do not obstruct the movement of a work piece 130 on top wall upper surface 98.

Guide Assemblies

Figure 12:
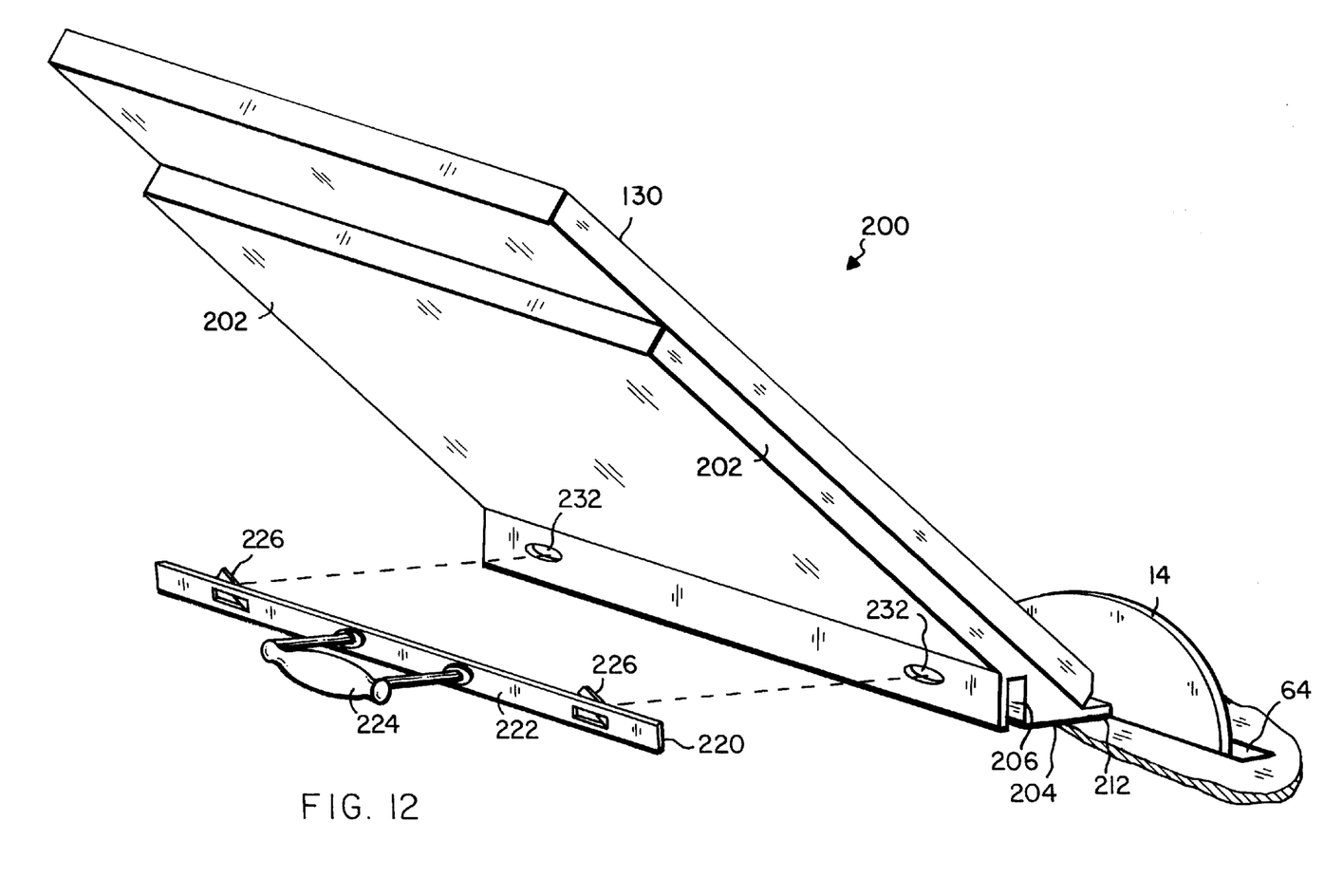
FIG. 12 is a perspective view of the inventive miter edge forming guide.

A miter guide assembly (not shown) of conventional design is preferably provided and removably anchored into channels 102a. An inventive miter edge forming guide 200 is also provided for cutting a mitered edge along a work piece 130. See FIG. 12. Edge forming guide 200 includes a planar work piece supporting panel 202 having a mitered edge 204. An inverted channel portion 206 extends adjacent mitered edge 204 at a right angle with respect to the plane of mitered edge 204 and receives a conventional fence bar (not shown) placed within a channel 102 or 102a so that supporting panel 202 is oriented at the intended miter angle with respect to the table top wall 26. A narrow stop flange 212 protrudes along the lower edge of supporting panel 202 to support the work piece 130 so that the work piece 130 does not advance downward into the blade 14. Stop flange 212 is narrow enough not to obstruct substantial cutting of the work piece 130 edge. To hold edge forming guide 200 steady during cutting, a handle structure 220 is provided in the form of a metal slat 222 having a handle 224 at its middle region and a jamb or clip 226 at each end which removably fits into clip ports 232 in channel portion 206. Clips 226 are preferably elongate strips punched out of metal slat 222 on three sides, including two longitudinal sides.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A saw apparatus for cutting a work piece, comprising:
a circular saw blade,
saw blade drive means including a motor drivably connected to said saw blade and having a motor pulley, and including blade mounting means,
a saw table including a housing with a housing side wall, and a housing top wall having a blade passing opening, said housing top wall being hingedly secured to and resting on said housing side wall, a housing partition defining a drive means chamber and a blade mounting chamber within said housing having a drive means chamber bottom wall sealingly joined to said housing side wall, and a cooling liquid contained within said blade mounting chamber,
such that said blade mounting means includes a blade axle extending through said housing partition between said blade mounting chamber and said drive means chamber, and said blade protrudes up through said blade passing opening and down into said cooling liquid, and a blade axle pulley is secured to said blade axle, passes through the housing partition, and a belt extends from said blade axle pulley to said motor pulley.

2. The apparatus of claim 1, additionally comprising a power cord for releasibly connecting said motor to a power source, said power cord having releasibly coupling plug means dividing said power cord into first and second cord portions adjacent to said motor for separation for motor removal.

3. A saw apparatus for cutting a work piece, comprising:
a circular saw blade,
saw blade drive means including a motor having a motor pulley and including blade mounting means having a blade axle to which said blade is mounted and to which a blade axle pulley is mounted, and a belt extending from said blade axle pulley to said motor pulley drivably connecting said motor to said saw blade,
a saw table including a housing with a housing side wall, a housing top wall having an upper surface and having a blade passing opening, and a blade mounting chamber having a chamber side wall and a sealingly interconnected chamber bottom wall and containing a cooling liquid and a portion of said saw blade, such that said blade protrudes up through said blade passing opening and down into said cooling liquid,
a drain channel recessed into the upper surface of said top wall for receiving cooling liquid and debris from said blade washing over said top wall and at least one drain hole in said drain channel for passing said cooling fluid from said drain channel and into said blade mounting chamber,
wherein said drain channel comprises a channel peripheral portion extending along the periphery of said top wall,
wherein a transverse portion of said channel additionally extends across said top wall upper surface within said channel peripheral portion.

4. A saw apparatus for cutting a work piece, comprising:
a circular saw blade,
saw blade drive means drivably connected to said saw blade,
a saw table having a top wall with a blade passing opening through which said blade extends,
a saw guard mounting arm assembly including an arm fulcrum bracket means secured to said table,
an arm structure having a pivot end rotatable mounted to said fulcrum bracket means and spaced laterally from said table and a guard end secured to said saw guard,
a saw guard including a channel member pivotally mounted to said arm structure, such that said channel member is movable to various elevations over said blade while remaining in an upright orientation;
and a transparent guard sheet securable to said channel member and positioned over said top wall for providing broader shielding for an apparatus user.

* * * * *